US012363258B2

(12) United States Patent
Bakke

(10) Patent No.: US 12,363,258 B2
(45) Date of Patent: *Jul. 15, 2025

(54) SYSTEM AND METHOD FOR REDIRECTING AUDIO AND VIDEO DATA STREAMS IN A DISPLAY-SERVER COMPUTING SYSTEM

(71) Applicant: Netzyn, Inc., Dallas, TX (US)

(72) Inventor: Steve Bakke, Dallas, TX (US)

(73) Assignee: Netzyn, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 16/981,966

(22) PCT Filed: Mar. 22, 2019

(86) PCT No.: PCT/US2019/023680
§ 371 (c)(1),
(2) Date: Sep. 17, 2020

(87) PCT Pub. No.: WO2019/183539
PCT Pub. Date: Sep. 26, 2019

(65) Prior Publication Data
US 2021/0099671 A1    Apr. 1, 2021

Related U.S. Application Data

(60) Provisional application No. 62/646,429, filed on Mar. 22, 2018.

(51) Int. Cl.
*H04N 7/12* (2006.01)
*H04L 65/70* (2022.01)
(Continued)

(52) U.S. Cl.
CPC ............... *H04N 7/12* (2013.01); *H04L 65/70* (2022.05); *H04N 7/01* (2013.01); *H04N 19/423* (2014.11)

(58) Field of Classification Search
None
See application file for complete search history.

(56) References Cited

U.S. PATENT DOCUMENTS 8,280,982 B2    10/2012  La Joie et al.
9,665,646 B1 *   5/2017  Belan .................... H04N 19/00
(Continued)

FOREIGN PATENT DOCUMENTS

EP           1788773 A1      6/2007
WO     WO2008044916 A2      4/2008

OTHER PUBLICATIONS

Zhang J, Frater MR, Arnold JF, Percival TM. MPEG 2 video services for wireless ATM networks. IEEE Journal on Selected Areas in Communications. Jan. 1997;15(1):119-28. (Year: 1997).*

*Primary Examiner* — Clifford Hilaire
(74) *Attorney, Agent, or Firm* — The Langley Law Firm, P.C.

(57) ABSTRACT

A system operative on a data communications network to operate on an audio/video data includes a server computer communicatively connected to the network. The server computer includes an application unit running an application program. The application program is accessible to a user device communicatively connected to the network. The application unit requires the audio/video data to run the application program. The system also includes an audio/video server computer communicatively connected to the network. The audio/video server computer communicates the audio/video data over the network responsive to a request. The user device includes at least a buffer, a decoder and an output device. The need request is sent by the server computer over the network to the user device, for receipt of the audio/video data for operation of the application unit. The need request includes an identifier of the audio/video data and a network address of the audio/video server com- (Continued)

puter. The user device, upon receipt of the need request, requests communicatively over the network to the audio/video server computer and the audio/video server computer delivers communicatively over the network the audio/video data to the user device. The user device reformats the audio/video data and delivers the reformatted audio/video data to the server computer. The server computer reverses the reformatted audio/video data to obtain substantially the original audio/video data for operations of the application unit.

16 Claims, 3 Drawing Sheets

(51) Int. Cl.
*H04N 7/01* (2006.01)
*H04N 19/423* (2014.01)

(56) References Cited

U.S. PATENT DOCUMENTS

| | | | |
|---|---|---|---|
| 2002/0196853 A1* | 12/2002 | Liang | H04N 19/48 375/240.16 |
| 2006/0026162 A1 | 2/2006 | Salmosen et al. | |
| 2012/0084460 A1* | 4/2012 | McGinnity | H04L 67/61 709/242 |
| 2015/0127775 A1* | 5/2015 | Munagala | H04N 21/222 709/219 |
| 2015/0334420 A1* | 11/2015 | De Vleeschauwer | H04N 19/30 375/240.19 |
| 2016/0337420 A1 | 11/2016 | Hobgood et al. | |

* cited by examiner

SYSTEM AND METHOD FOR REDIRECTING AUDIO AND VIDEO DATA STREAMS IN A DISPLAY-SERVER COMPUTING SYSTEM

CROSS-REFERENCE TO RELATED APPLICATION

The present application has benefit of priority of the following application, which is and has at least one same inventor of the present application and is incorporated herein by this reference: U.S. Provisional Patent Application Ser. No. 62/646,429, titled "System and Method for Redirecting Audio and Video Data Streams in a Display-Server Computing System," filed Mar. 22, 2018.

TECHNICAL FIELD

The present invention generally relates to computing systems and more specifically relates to display-server systems and communications networks.

BACKGROUND

End-user computing software programs and their operations (i.e., applications) have traditionally been processed (i.e., run) on an end-user device itself, for example, a personal computer (PC) running an application of the PC, a smartphone running an application on the smartphone, a game console running a game application on the console, and others. A different approach is to run end-user applications on data center-located servers. These server-run applications are delivered to the end-user device, such as those described or even a display device with limited processing capability, via communicative connection of the end-user device to the servers. Such a display-server system is described in U.S. Pat. No. 8,700,723. When the application that is run on the server receives audio and video from an external source, the audio and video data must be passed on to the end-user display device by the server. The network bandwidth required includes bandwidth occupied by the communication of the data to the server and also bandwidth occupied by the communication of the data by the server to the end-user device. In effect, the bandwidth requirement is doubled.

Referring to FIG. 1, a non-exclusive example of a conventional system 100 includes an application unit 105 running directly on a device 106, such as an end-user computer, smart phone, console or other device. The device 106 is communicatively connected to a network 102. System 100 details typical usage of a non-display-server system in which significant processing and storage for operating the application unit is required of the device 106. The application unit 105 running on the device 106 requires audio/video data available from an audio/video server 101 communicatively connected to the network 102. The device 106 sends a request 103 for that audio/video information on the network 102 to the audio/video server 101. The audio/video server 101 responds with the desired audio/video data 113 communicated over the network 102 to the device 106. The application unit 105 of the device 106 receives the audio/video data 113 and stores it in a buffer 112 of the device 106. When there is sufficient audio/video data in the buffer 112, the application unit 105 issues a command 107 to a decoder 110 of the device 106 to start decoding. The output of the decoder is displayed on display 109.

In a display-server computing system, a server computer operates the application unit. When audio and/or video data is needed for operating the application unit, the server computer conventionally contacts an audio/video server computer via a network and requests the audio/video data. The audio/video data is sent over the network by the audio/video server computer to the server computer operating the application unit. The server computer operating the application unit then must send the audio/video data for operations of the application unit to a user device, such as a display, personal computer, smart phone, console or other device. The user device communicates with the server computer, and the server computer delivers the audio/video data associated with the operating application unit on the server computer. Bandwidth requirements are significant in such conventional display-server computing system, because audio/video data must be retrieved by the server computer and communicated by the server computer to the user device.

It would be a significant improvement in the art and technology to provide for more efficient and optimized flow of audio and video data to the end-user device, such as a personal computer, a smartphone, a console, or even a display with limited processing capability or other device.

SUMMARY

An embodiment of the invention is a system including a server computer running an application unit on the server computer, a user device communicatively connected to that server computer, and another server computer capable of communicating audio and video data. The server computer of the application unit and the user device each include a decoder for decrypting the audio and video data.

The server computer running the application unit has need for audio/video data from the other server computer of the audio/video data for operation of the application unit (typically the other server computer of audio/video data differs from that running the application unit, although the same server may host the application unit and provide the audio/video data in embodiments). A request for that audio/video data together with an identifier of the audio/video server computer is sent to the user device by the server computer running the application unit. The user device forwards that request to the audio/video server computer. The audio/video server computer responds with the desired audio/video data to the user device. The user device receives the audio/video data and stores it in a buffer. The audio/video data is also reformatted by the user device to only include data that the server computer running the application unit needs for operations of the application unit, and does not include data that the decoder needs. This greatly reduces the audio/video data size of the reformatted data. The reformatted data is communicated by the user device to the server computer of the application unit for operating the application unit.

The server computer of the application unit receives the reformatted audio/video data and transforms the data back to a standard format before handing off the audio/video data to the application unit. To the application unit operated on the server computer, the audio/video data is indistinguishable from the original audio/video data sent from the audio/video server computer to the user device. The application unit operating on the server computer stores this audio/video data in a buffer and uses as normal for operating the application unit. When there is sufficient audio/video data in the buffer, the application unit issues a command to a decoder of the server computer to start decoding. The decode command is forwarded to a user device, such as a display device, and a decoder of the user device will start decoding the audio/video from the user device's local buffer. Therefore, the audio/video data used by user device's decoder is the actual audio/video data sent from the audio/video server and a very limited amount of audio/video data was sent to the server by the user device.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
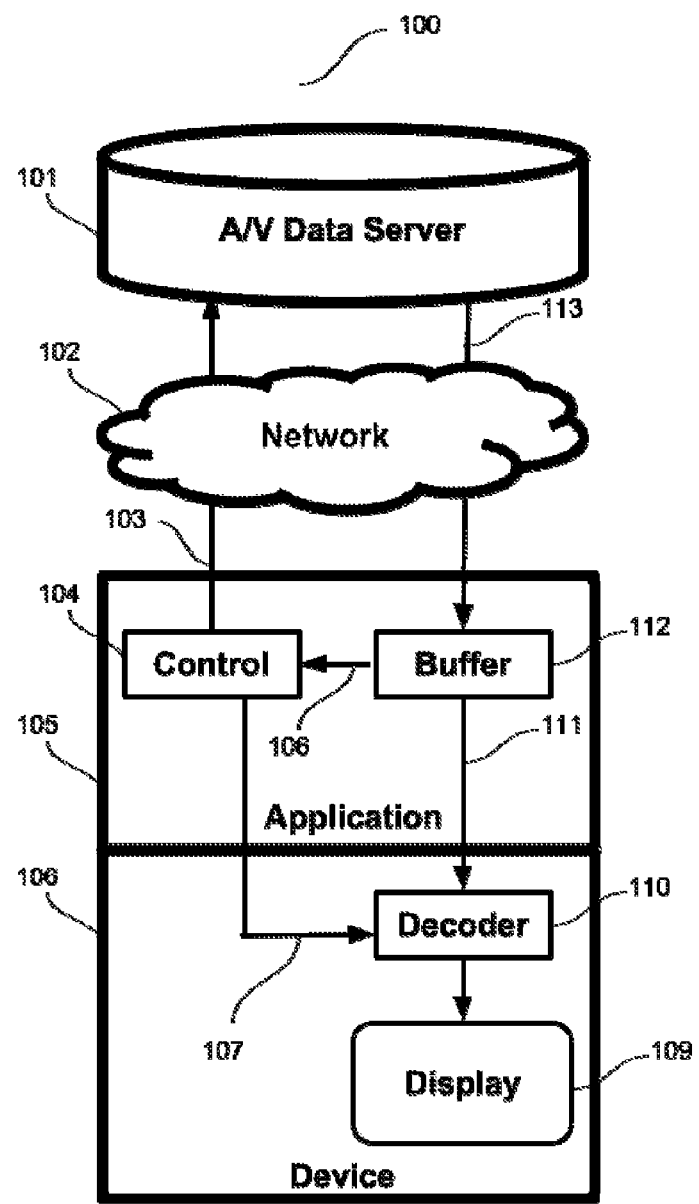
FIG. 1 illustrates a system operative over a data communications network of a server computer running an application program accessed by a user or display system in a conventional display-server system, according to certain embodiments of the invention.
Figure 2:
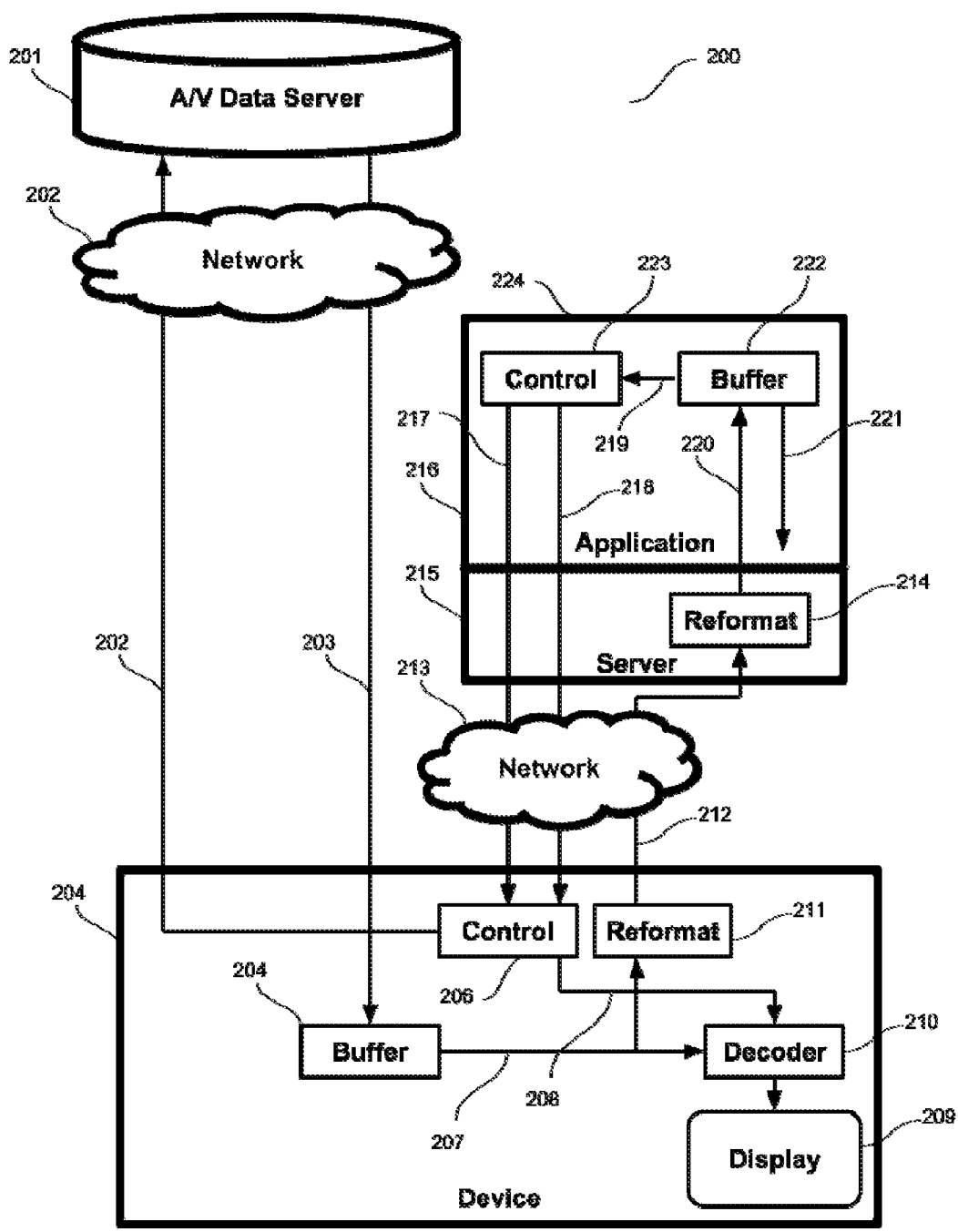
FIG. 2 illustrates a system operative over a data communication network of a server computer running an application program accessed by a user or display system, in which the user or display system, rather than the server computer, obtains audio/video data from an audio/video server computer, and the user or display system transmits reformatted audio/video data to the server computer for use by the running application program, according to certain embodiments of the invention.

Referring to FIG. 2, a non-exclusive example embodiment of a system 200 includes a server computer 215. The server computer 215 includes or communicatively connects, such as over a data communications network, to an application unit 224. The server computer 215 includes, by way of example and not limitation, a processor 223, a buffer 222, and a reformatting module 214. The application unit 224 also includes a decoder. The application unit 224 runs on the server computer 215.

The server computer 215 of the application unit 224 communicatively connects to one or more network 202, 213, which may be the same or different network and may in each instance include combinations of communications networks, e.g., wired and/or wireless data networks.

An audio/video data server computer 201 is communicatively connected to one or more network 202, 213. In the example embodiment, the network 202 may be same or different from the network 213. As non-exclusive example, the audio/video server computer 201 may include a processor, a buffer, and memory. The audio/video data server computer 201 communicates over the network 202 data representing audio and video information that is useable by the application unit 224 of the server computer 215, and that is also useable by a user device 204, such as, for example, a display, a personal computer, a smartphone, a console, or other device, for output display or audio.

The user device 204 is communicatively connected via a network 202 to the audio/video server computer 201 and via a network 213 to the server computer 215. The networks 202, 213 may be same or different, in whole or part. The user device 204, as non-exclusive example, includes a control/processor 206, a buffer 204, a decoder 210, a display 209 or other output, and a reformat module 211. The user device 204 may include other or alternate elements, as applicable. The user device 204 may but need not necessarily have limited storage and processing capability. In the example embodiment, the applicaton unit 224 operating on the server computer 215 is accessed by the user device 204 over the network 213 for providing a running applicaton for the user device 204.

In operation, the server computer 215 controllingly operates the application unit 224 for access by the user device 204. In such operation, the application unit 224 requires audio/video data. The audio/video data is available from the audio/video data server computer 201. The server computer 215 communicatively sends on the network 213 a request 217 for that audio/video data, together with an identifier of the audio/video server 201, to the user device 204. The user device 204, via the processor 206, receives the request 217. The user device 204 communicatively forwards on the network 202 a request 202 to the audio/video server 201. The audio/video server 201 responds over the network 202 to the user device 204 with the desired audio/video data 203. The user device 204 receives the audio/video data 201 and stores it in a buffer 204. The audio/video data 203 is also reformatted 211 by the user device 204 to only include data that the application unit 224 needs for operation of the application unit 224, and does not include data that the decoder of the server computer 215 needs. The reformatted 211 audio/video data is sized significantly smaller than the original audio/video data received by the user device 204 from the audio/video server 201. The reformatted data 212 is sent by the user device 204 to the server computer 215 over the network 213.

The server computer 215 receives over the network 213 the reformatted data 212 from the user device 204. The server computer 215 processes the reformatted data 212 by transforming the data 212 back to standard format of the original audio/video data 203 received by the user device 204. The reformatting module 214 of the server computer 215 receives the reformatted data 212. The reformatting module 214 transforms the reformatted data 214 back to a standard format of an audio/video data 220, which is substantially the same as the original audio/video data 203. The transformed data, i.e., the audio/video data 220, from the reformatting module 214 is handed off by the reformatting module 214 to the application unit 224 of the server computer 215. The audio/video data 220 is indistinguishable to the application unit 224 from the original audio/video data 203 sent from the audio/video server 201. The application unit 224 stores the audio/video data 220 in the buffer 222 and the audio/video data 220 is used for operations by the application unit 224. When there is sufficient audio/video data 220 in the buffer 222, the application unit 224 issues a command 218 to the decoder of the server computer to start decoding the audio/video data 220. The decode command 218 is forwarded by the server computer 215 on the network 213 to the user device 204, and the decoder 210 of the user device 204 decodes the original audio/video data 203 stored in the user device's local buffer 204. The output of the decoder 210 is displayed on display 209, output as audio, or otherwise output by the user device 204 according to the nature of the audio/video data 203.

Therefore, the audio/video data 203 used by the decoder 210 is the actual audio/video data 203 sent by the audio/video server 201 to the user device 204. The audio/video data 212 sent by the user device 204 to the server computer 215 is significantly less than the original audio/video data 203. Bandwidth requirements for the communications are reduced.

Figure 3:
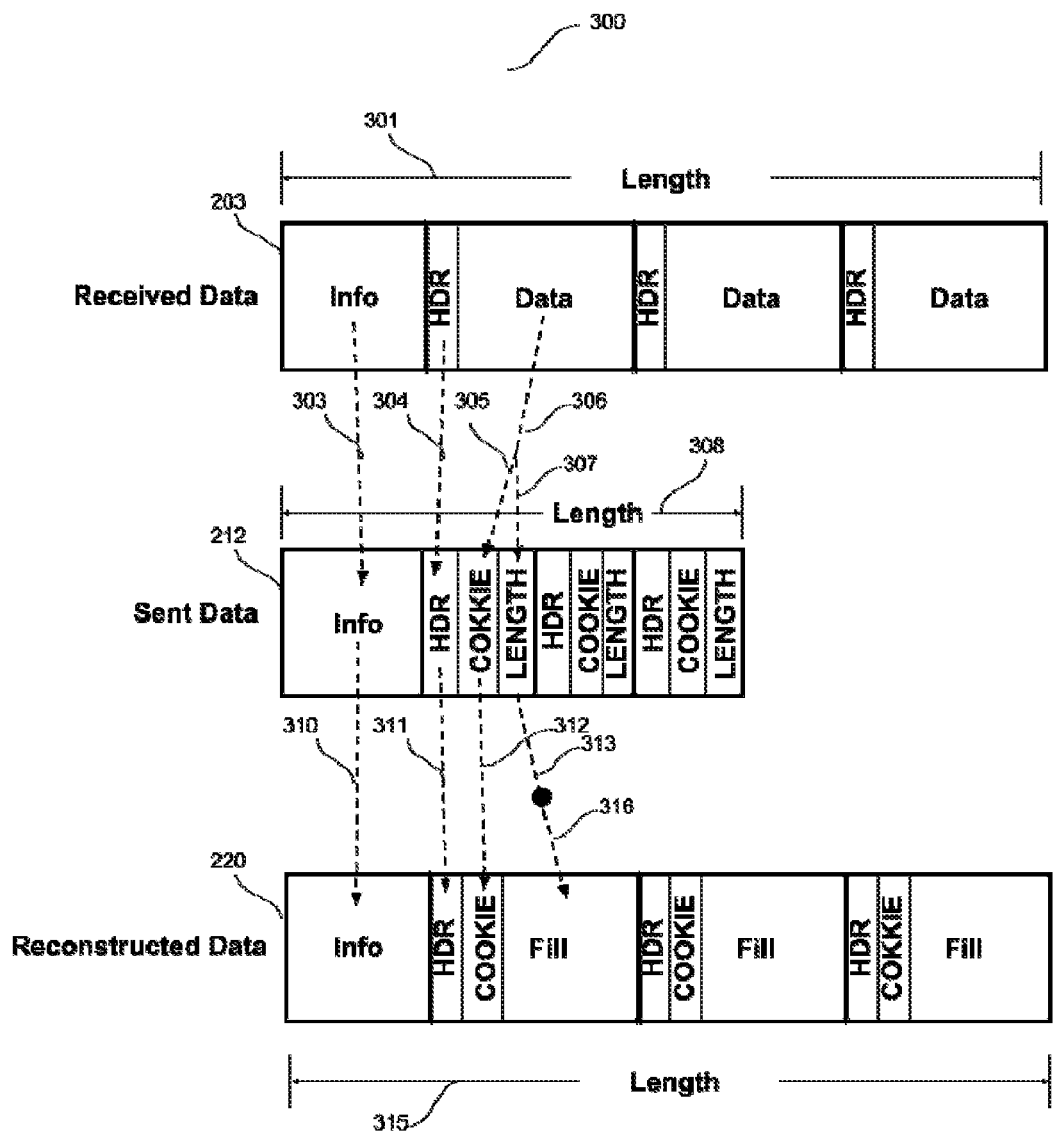
FIG. 3 illustrates exemplary audio/video data streams, including reformatted audio/video data streams and reconstructed audio/video data streams, delivered to and used by a user or display device and a server computer running an application program accessed by the user or display device, according to certain embodiments of the invention.

Referring to FIG. 3, in conjunction with FIG. 2, a non-exclusive example embodiment of a system 300 includes three data formats for audio/video data in the foregoing. The three data formats include a received audio/video data stream 203, a sent audio/video stream 220, and a reconstructed audio/video data stream 220. The received audio/video data stream 203 is received by the user device 204 from the audio/video server 201.

The user device 204 reformats the received audio/video data stream 203 transforming to the sent audio/video data stream 203. The reformating consists of copying info data 303 and header data 304 directly to sent audio/video data 212. Then the decoder data 306 is converted into a cookie 305 and a length 307. This process is repeated for each section of the received audio/video data stream 203.

The sent audio/video data 212 is received by the server computer 215 from the user device 204. The server computer 215 reformats 214 the sent audio/video data 212 from the user device 204 into the reconstructed audio/video data stream 220. The reformating consists of copying the info data 310, header data 311 and cookie 312 data directly to the reconstructed audio/video data stream 220. Then using the length 313, that amount of fill data 316 is created in the recontructed audio/video data stream 220. This process is repeated for each section of the sent audio/video data 212.

The length 301 of the received audio/video data stream 203 and the length 301 of the reconstructed audio/video data stream 220 is exactly the same. The length 308 of the sent audio/video data stream 212 is much smaller than the received audio/video data stream 203.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and device(s), connection(s) and element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system operating on a data communications network, the system operates with an audio/video server computer communicatively connected to the network, the audio/video server computer has a network identifier unique to the audio/video server computer, the audio/video server computer configured to deliver an audio/video data, responsive to a request for the audio/video data, the audio/video data of a first format of original info data, original header data, decoder data, original header data, decoder data, original header data and decoder data, comprising:

a display device communicatively connected to the network, configured to receive a request, together with the network identifier, for the audio/video data, and, responsive to the request, request and receive the audio/video data;

a reformatter unit of the display device, the reformatter unit transforms the audio/video data of the first format to a reformatted audio/video data of a second format of reformatted info data, reformatted header data, reformatted cookie, reformatted length, reformatted header data, reformatted cookie, reformatted length, reformatted header data, reformatted cookie and reformatted length, wherein the original info data and the original header data are directly copied into the reformatted info data and the reformatted header data, and the decoder data is converted into the reformatted cookie and reformatted length;

a server computer communicatively connected to the network, configured to send the request, together with the network identifier, and to receive the reformatted audio/video data from the reformatter unit, the server computer transforms the second format to a reconstructed audio/video data of the first format of reconstructed info data, reconstructed header data, reconstructed cookie, fill data, reconstructed header data, reconstructed cookie, fill data, reconstructed header data, reconstructed cookie and fill data, wherein the reformatted info data, reformatted header data and reformatted cookie are directly copied into the reconstructed info data, reconstructed header data and reconstructed cookie, and the fill data is created using the reformatted length, whereby the reconstructed audio/video data corresponds to the audio/video data of the first format;

an application unit of the server computer for processing the reconstructed audio/video data corresponding to the audio/video data of the first format.

2. The system of claim 1, wherein the reformatted audio/video data of the second format is delivered to the server computer by the display device and contains less bytes than the audio/video data of the first format, received by the display device from the audio/video server computer.

3. The system of claim 1,
wherein the application unit operates with the reformatted audio/video data of the second format with same result as at the display device.

4. The system of claim 1, wherein the display device decodes the audio/video data of the first format and outputs the audio/video data of the first format via either a display of the display device or another output device.

5. A system operative on a data communications network to operate on an audio/video data of a first format of original info data, original header data, decoder data, original header data, decoder data, original header data and decoder data, the system includes an audio/video server computer communicatively connected to the network, the audio/video server computer configured to communicate the audio/video data of the first format over the network responsive to a need request that includes an identifier of the audio/video data and a network address of the audio/video server computer, comprising:

a server computer communicatively connected to the network, the server computer includes an application unit running an application program communicatively connected to the network, the application unit requires a reformatted audio/video data of a second format of reformatted info data, reformatted header data, reformatted cookie, reformatted length, reformatted header data, reformatted cookie, reformatted length, reformatted header data, reformatted cookie and reformatted length, wherein the original info data and the original header data are directly copied into the reformatted info data and the reformatted header data, and the decoder data is converted into the reformatted cookie and reformatted length, to run the application program; and a user device communicatively connected to the network, the user device includes at least a buffer, a decoder and an output device, configured to receive the need request, send the need request to the audio/video server computer, receive the audio/video data from the audio/video server computer, and transform the audio/video data of the first format to the reformatted video of the second format;

wherein the server computer, configured to receive the reformatted audio/video data of the second format from the user device and transform the reformatted audio/video data of the second format to a reconstructed audio video data of the first format of reconstructed info data, reconstructed header data, reconstructed cookie, fill data, reconstructed header data, reconstructed cookie, fill data, reconstructed header data, reconstructed cookie and fill data, wherein the reformatted info data, reformatted header data and reformatted cookie are directly copied into the reconstructed info data, reconstructed header data and reconstructed cookie, and the fill data is created using the reformatted length, for operations of the application unit operating the application program, whereby the reconstructed audio/video data corresponds to the audio/video data of the first format.

6. The system of claim 5 further comprising:
a decoder of the user device, the decoder of the user device decodes the audio/video data of the first format for output by the user device.

7. The system of claim 5, wherein the reformatted audio/video data of the second format is less than the size of the audio/video data of the first format.

8. The system of claim 5, wherein reduced bandwidth is required for delivery by the user device of the reformatted audio/video data of the second format to the server computer for operation of the application unit on the reconstructed audio/video data of the first format.

9. A method, the method is operable over a data communications network with an audio/video server computer communicatively connected to the network, the audio/video server computer configured to deliver an audio/video data of a first format of original info data, original header data, decoder data, original header data, decoder data, original header data and decoder data, responsive to request for the audio/video data, comprising:

controlling an application unit for operation on the audio/video data by a server computer, the application unit requires a reconstructed audio/video data of the first format of reconstructed info data, reconstructed header data, reconstructed cookie, fill data, reconstructed header data, reconstructed cookie, fill data, reconstructed header data, reconstructed cookie and fill data, wherein the reformatted info data, reformatted header data and reformatted cookie are directly copied into the reconstructed info data, reconstructed header data and reconstructed cookie, and the fill data is created using the reformatted length;

delivering over the network by a server computer a need request to a user device communicatively connected to the network, the need request includes a network identifier of the audio/video server computer and identifier of the audio/video data;

requesting by the user device, responsive to receiving the need request, over the network from the audio/video server the audio/video data;

receiving by the user device the audio/video data;

reformatting the audio/video data to a reformatted audio/video of a second format of reformatted info data, reformatted header data, reformatted cookie, reformatted length, reformatted header data, reformatted cookie, reformatted length, reformatted header data, reformatted cookie and reformatted length, wherein the original info data and the original header data are directly copied into the reformatted info data and the reformatted header data, and the decoder data is converted into the reformatted cookie and reformatted length, of smaller size; p1 sending over the network by the user device the reformatted audio/video data of the second format, for receipt by the server computer;

receiving by the server computer the reformatted audio/video data of the second format;

transforming by the server computer the reformatted audio/video data of the second format, to the reconstructed audio/video data of the first format;

delivering by the reformatting module the reconstructed audio/video data of the first format to the application unit; and operating by the application unit on the reconstructed audio/video data of the first format.

10. The method of claim 9, further comprising:
processing by the user device the audio/video data of the first format;

outputting by the user device a signal selected from the group of: audio, video, or combinations of these, for the audio/video data;

wherein operating includes the application unit processes the reconstructed audio/video data of the first format, with same result of the application unit as the audio/video data of the first format processed by the user device.

11. The method of claim 10, further comprising:
storing by the user device the audio/video data of the first format in a buffer of the user device;

decoding by the user device the audio/video data of the first format of the buffer; and wherein outputting by the user device is via an output device communicatively connected to the user device.

12. The method of claim 11, further comprising:
storing in a buffer by the server computer the reformatted audio/video data of the second format;

transforming by the server computer the reformatted audio/video data of the second format to the reconstructed audio/video data of the first format;

storing in the buffer by the server computer the reconstructed audio/video data of the first format decoding by the server device the reconstructed audio/video data of the first format of the buffer; and wherein operating by the application unit includes processing the reconstructed audio/video data of the first format.

13. The method of claim 9, wherein the reformatted audio/video data of the second format is smaller in size than the audio/video data of the first format.

14. The method of claim 10, wherein the reformatted audio/video data of the second format is smaller in size than the audio/video data of the first format.

15. The method of claim 11, wherein the reformatted audio/video data of the second format is smaller in size than the audio/video data of the first format.

16. The method of claim 12, wherein the reformatted audio/video data of the second format is smaller in size than the audio/video data of the first format.

\* \* \* \* \*